Figure 18:
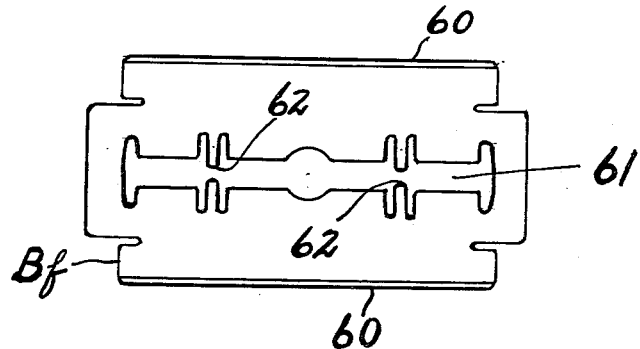

March 5, 1963
J. T. SCULLY
3,079,685
SAFETY RAZORS WITH A FLEXIBLE BLADE AND
RELATIVE BLADE AND GUARD ADJUSTMENT
Original Filed Dec. 11, 1953
5 Sheets-Sheet 1
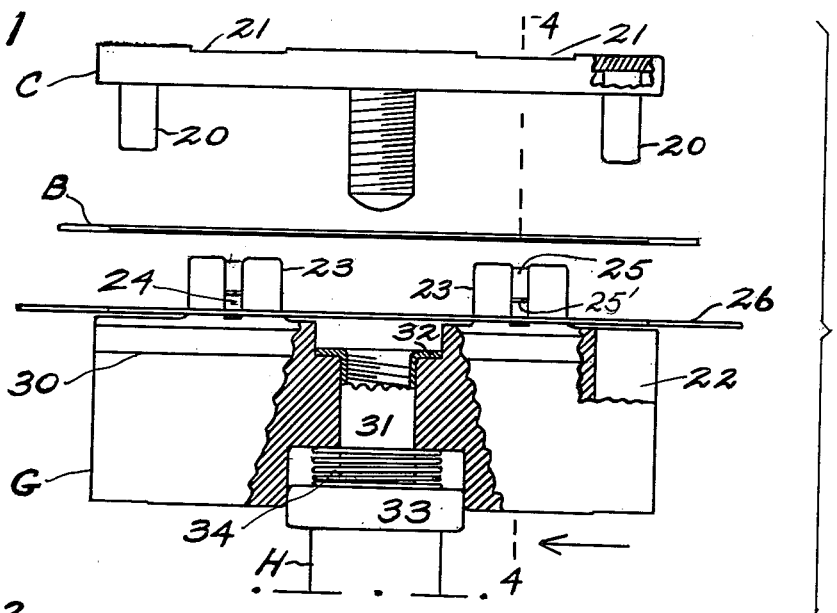
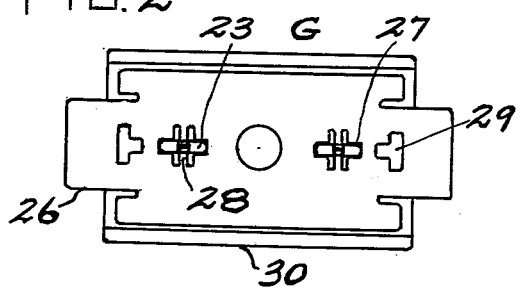
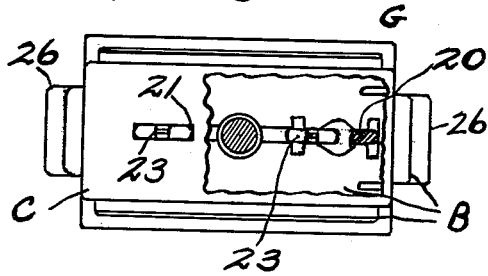
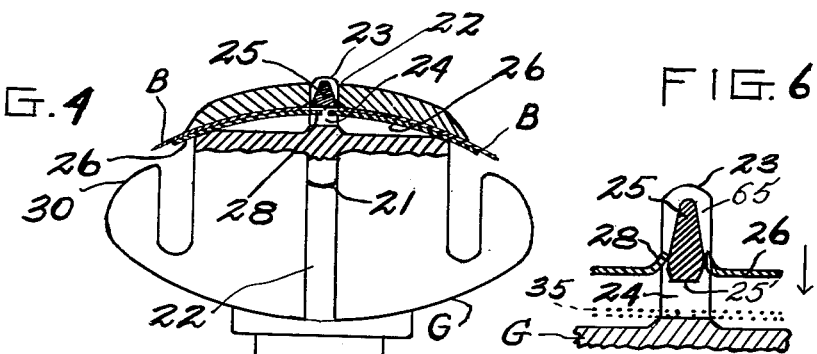
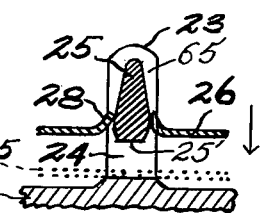
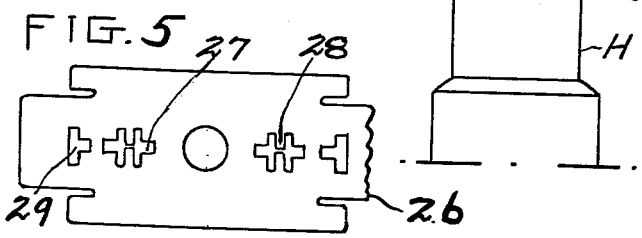
John J. Scully
INVENTOR.

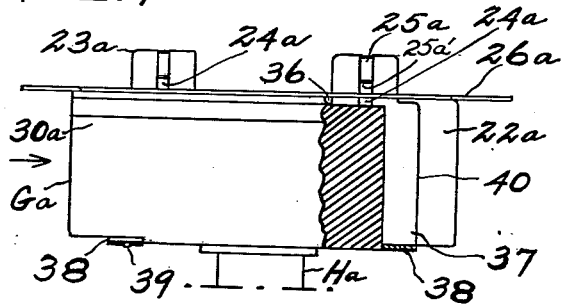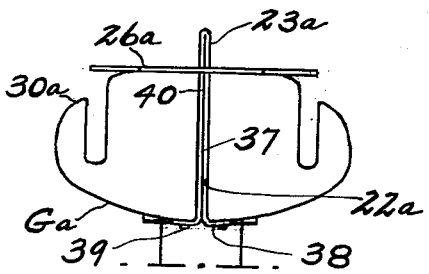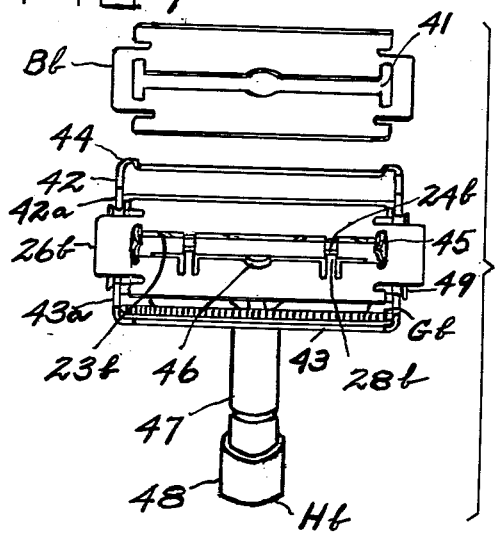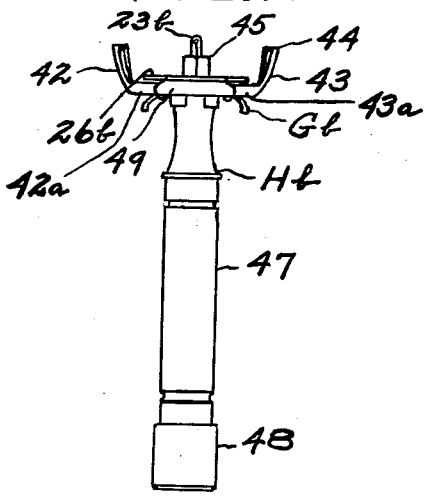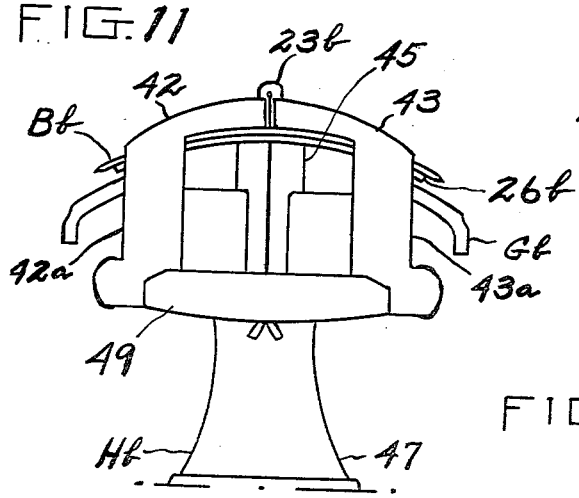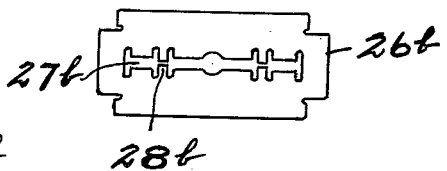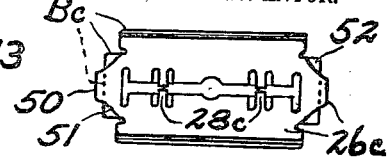

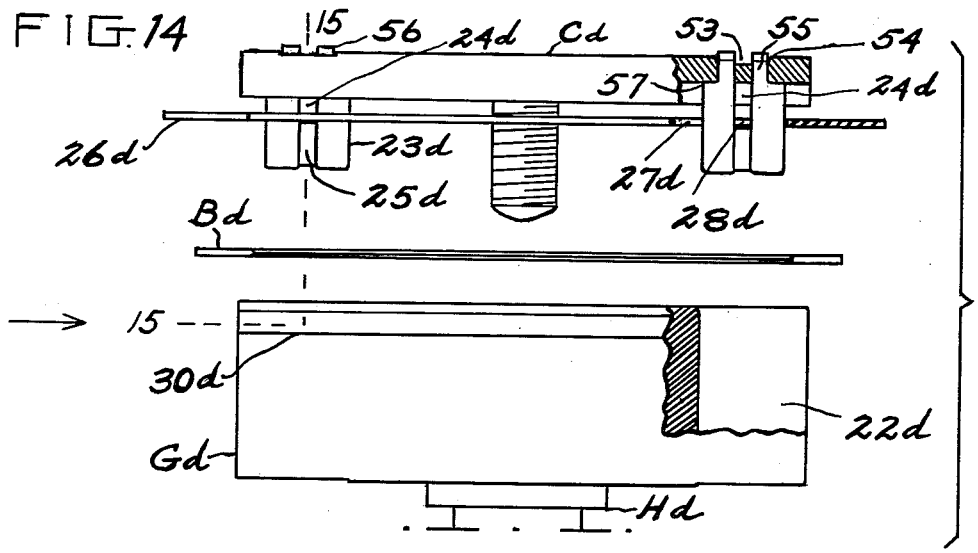
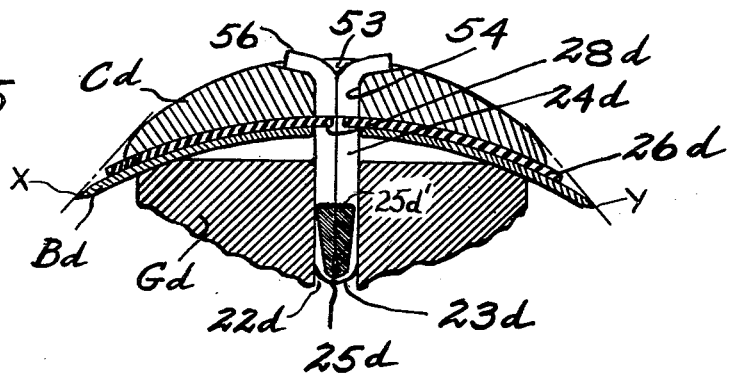
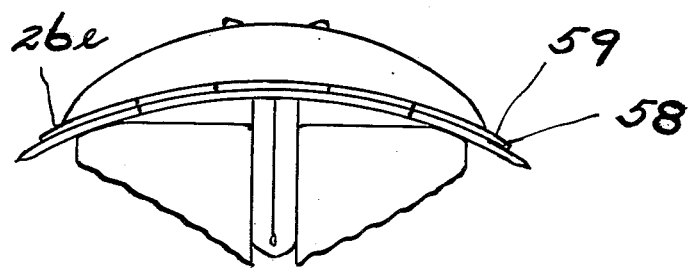
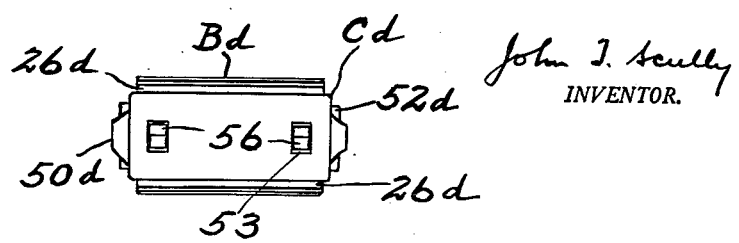

John J. Scully
INVENTOR.

John J. Scully
INVENTOR.

United States Patent Office 3,079,685
Patented Mar. 5, 1963

3,079,685
SAFETY RAZORS WITH A FLEXIBLE BLADE AND RELATIVE BLADE AND GUARD ADJUSTMENT
John T. Scully, 235 W. 76th St., New York 23, N.Y.
Continuation of application Ser. No. 397,678, Dec. 11, 1953. This application Aug. 12, 1958, Ser. No. 754,689
15 Claims. (Cl. 30—72)

My invention relates to safety razors generally and more particularly to safety razors of the type wherein a replaceable, flexible razor blade is flexed and clamped by the cooperative action of cap and guard members.

Among the objects of the present invention are to provide a generally improved safety razor; to provide improved means for assembling in the razor, detachably secured therein, a blade-engaging spring member which, in manufacture of the razor is cheap and simple and which, for the user, makes replacement of the spring member simple and convenient. A further object is to provide improved means whereby the razor blade may be easily separated from the spring member, when the parts are unclamped, and be removed from the razor by the user for reversing, or replacement, or for cleaning, particularly in instances where the blade may tend to facedly adhere to the spring member because of substances used in packaging the blade or because of the cream or lather of the shaving preparation. A further object is to provide improved means, in a safety razor having cap and guard members, whereby the blade-engaging spring member, when unclamped, is freely bodily movable away from the blade-flexing face of one of the clamping members, but still secured in the razor, to space the parts and facilitate proper rinsing, drying and the like. A further object is to provide a safety razor wherein the user may employ the spring member to detachably secure a razor blade between it and one of the clamping members. A further object is to provide means whereby a razor blade secured between the spring member and one of the clamping members in an unclamped state is freely bodily movable, together with the spring member, to become spaced from the clamping face of the clamping member to facilitate rinsing and drying of the parts. A further object is to provide the aforesaid improved means in a razor in which the blade-engaging, flexible spring member will reinforce or brace the exposed longitudinal blade margins adjacent the shaving edges of the blade and thereby provide a firmer shaving edge. And a further object is to provide the improved means in a razor in which the blade margin reinforcing spring member will also provide increased tension between the guard and the rotatable handle during the shaving operation to minimize risk of accidental relative rotation of guard and handle.

Further objects are to provide, in the razor, means cooperative with means in the replaceable razor blade for detachably securing the blade to the razor even though the clamping members be separated. A further object is to provide, in a safety razor having longitudinally straight blade-flexing and clamping members, a double edge, replaceable, reversible, flexible razor blade of initially substantially cylindrical segment form, with longitudinally curved shaving edges, which, for strength and shaving edge rigidity, is as thick adjacent the shaving edge bevels as any other portion of the blade material transversely between the shaving edges and which may be placed in the razor, convex face up or down, and clamped and flexed transversely to present straight shaving edges with the blade under both longitudinal and transverse tension and, at the same degree of tightness or looseness of clamping and transverse flexing, to present the same degree of exposure of shaving edge to the guard whether the convex face of the blade be up or down. And a further object is to provide in the razor a curved blade of said characteristics which is easily and simply manufactured and which will, when clamped in the razor head longitudinally and transversely flexed therein, present increased tension between the head and the rotatable handle for adjusting the parts and which, when so clamped, will present firmer shaving edges than the usual flat blade.

Figure 19:
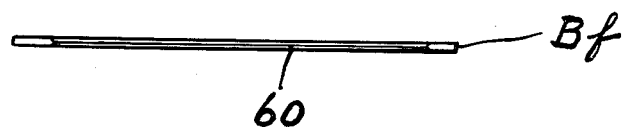
Figure 20:
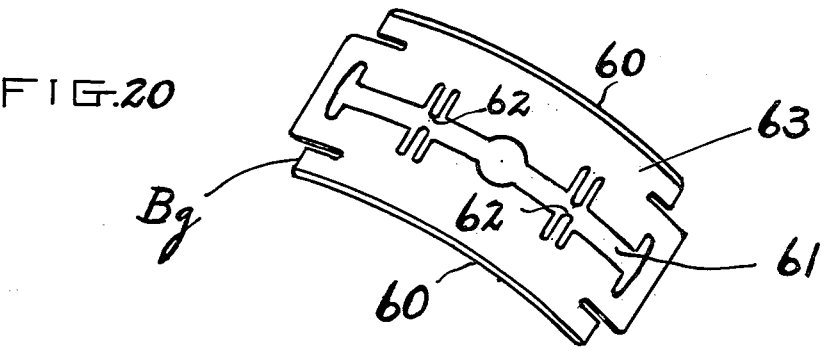
Figure 21:
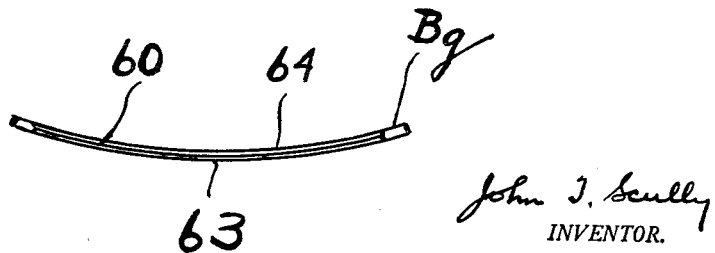
Figure 22:
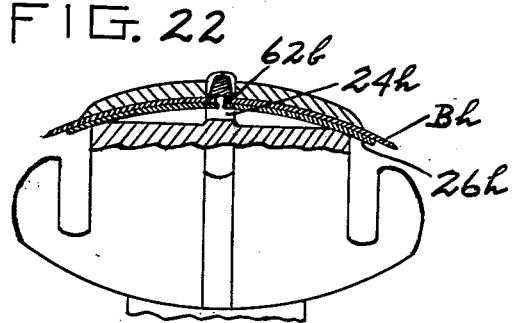
Figure 23:
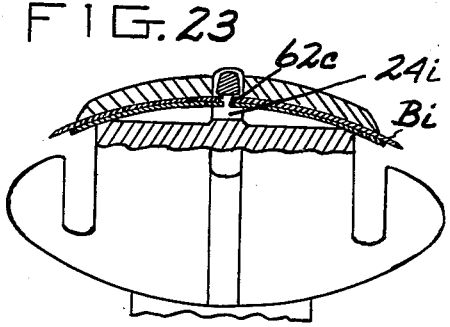
Figure 24:
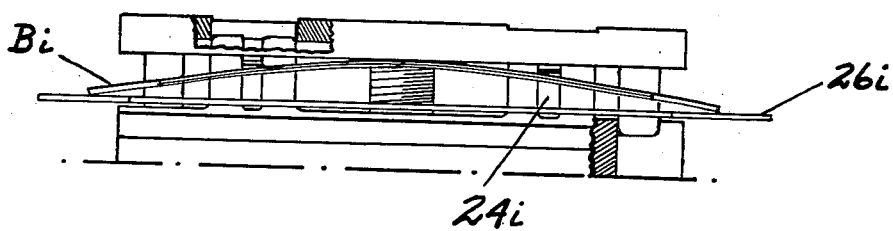
Figure 25:
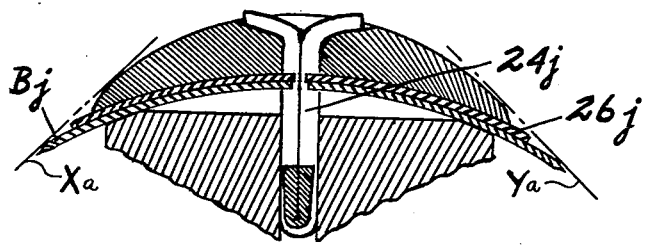
Figure 26:
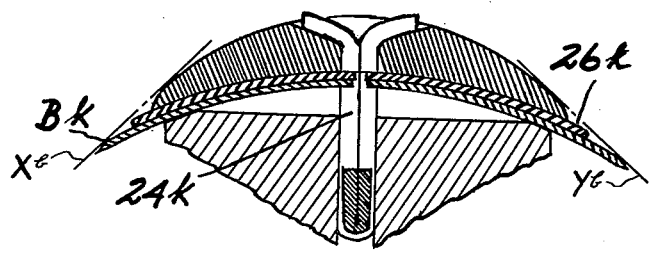
Figure 27:
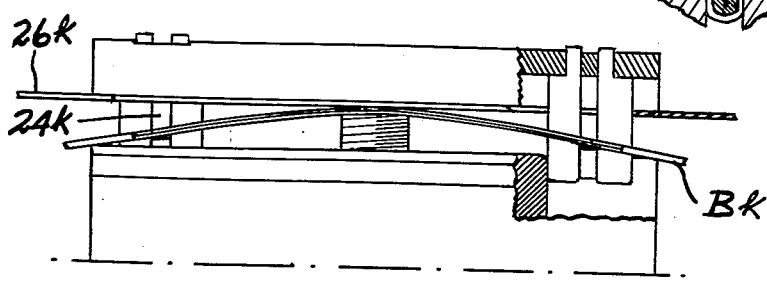

Other objects will hereinafter appear and be apparent from the description upon reference to the accompanying drawing, in which:

FIG. 1 is a side elevational view, with parts broken away to show parts in section, of the safety razor; FIG. 2 is a top plan view of certain parts shown in FIG. 1, on a smaller scale; FIG. 3 is a top plan view, with a part broken away and parts in section, of the head shown in FIG. 1 with cap, blade and guard clamped together; FIG. 4 is an end view and a partly sectional view of the parts shown in FIG. 1 clamped together, the sectional view being taken on the line 4—4 of FIG. 1; FIG. 5 is a fragmentary top view of a part shown detached from the razor; FIG. 6 is an enlarged sectional view of details of parts; FIG. 7 is a side view, partly elevational and partly sectional, illustrating a modification of parts; FIG. 8 is an end view of the parts shown in FIG. 7 looking in the direction of the arrow; FIG. 9 is a side perspective view of a further modification of razor; FIG. 10 is an end view of parts shown in FIG. 9, with a part omitted; FIG. 11 is an enlarged end plan view of the razor shown in FIG. 9 and with the blade clamped and flexed; FIG. 12 is a top plan view of a part shown in FIGS. 9, 10 and 11; FIG. 13 is a plan view of an upside down arrangement of parts to illustrate a modification of the end parts of a spring member relatively to the end parts of a flexible blade, the modified part being a modification of the corresponding part shown in FIGS. 1–6 inclusive, 7 and 8, and 9, 10 and 11; FIG. 14 is a side elevation, with parts broken away to show parts in section, of a further modification of razor; FIG. 15 is a fragmentary cross-sectional view of parts shown in FIG. 14, the sectional view being taken on line 15—15, and the parts being shown clamped together, of FIG. 14; FIG. 16 is a fragmentary end elevation showing a modification of a part in a razor otherwise similar to the razor shown in FIGS. 14 and 15; FIG. 17 is a top plan view, on a smaller scale, of parts shown in FIG. 14 clamped together as in FIG. 15; FIG. 18 is a face elevational view of a modification of the razor blade; FIG. 19 is a side view of the blade shown in FIG. 18; FIG. 20 is a perspective plan view of a further modification of the flexible and reversible razor blade; FIG. 21 is a side elevation of the blade shown in FIG. 20 turned upside down; FIG. 22 is a view similar to FIG. 4 of the razor shown in FIGS. 1–6, but modified to embody the part shown in FIGS. 18 and 19; FIG. 23 is a view similar to FIG. 4, but with the part shown in FIGS. 20 and 21 substituted for the part shown in FIGS. 18 and 19; FIG. 24 is a side view of FIG. 23 with parts loosened; FIG. 25 is a view similar to FIG. 15, but modified to embody a part similar to the part shown in FIGS. 18 and 19; FIG. 26 is a view similar to FIG. 25, but with the part shown in FIGS. 20 and 21 substituted for the part shown in FIGS. 18 and 19; FIG. 27 is a side view of FIG. 26 with parts loosened.

Similar reference characters refer to similar parts throughout the several views.

Referring again to the drawing, the safety razor and parts thereof shown in FIGS. 1–6 inclusive comprises a blade-clamping, detachable cap member C having a main or lengthwise axis, a transversely concave inner face, a perforated or slotted, flexible, replaceable razor blade B having oppositely disposed sharpened longitudinal edges providing its shaving edges, and a guard member G on which the handle H is rotatably swivelled. Cap member C has the usual externally threaded central post for engagement with the upper internally threaded end of the handle, and spaced from and longitudinally aligned with said post are blade locating or positioning bars 20, 20 which project downwardly from the concave face of the cap member substantially normal to the main axis thereof. Between the fastening post and bars 20, 20 and in alignment therewith, the cap member is provided with openings 21, 21 in the form of substantially rectangular slots extending longitudinally in the cap member. Guard member G has a main or lengthwise axis and, at its opposite longitudinal ends, is provided with slots 22 to receive cap bars 20, 20, and is also provided with spaced, longitudinally extending blade-positioning and spring member-positioning and securing bars 23, 23 projecting upwardly of the clamping face of the guard or substantially normal to its main axis, and bars 23, 23 are receivable in a sliding fit, or, if desired, in a looser fit, in openings 21, 21 of the cap member and, as shown, are integral with the guard member. The rigid side portions of bars 23, 23 which are received in openings 21, 21 serve as cap or guard-guiding means to properly guide the guard member towards the cap member for correctly positioning the parts. Bars 23, 23 are, at their bottoms or bases, longer and wider adjacent the clamping face of the guard than in their upper portions because of end face and side face bevels formed on the bars, in manufacture, as a result of their merger with the clamping face of the guard, the end face and side face bevels providing bar shoulders. Centrally of their lengths, bars 23, 23 are provided with transversely extending fastening indents or openings 24 which extend through the bars and extend upwardly therein, in the form of slots, a distance suitably far enough perpendicularly from the clamping face of the guard to permit proper transverse flexing of spring member 26 and the blade. Thus, it will be observed that bars 23, 23 provide and serve as securing means for the spring member 26 whereby to solely hold the spring member and guard member in assembled relation and also permit the spring member to be concentrically flexed facially together with the blade to facially support the blade. Openings 24 permit the spring member, unflexed, to be freely movable bodily up on bars 23, 23 sufficiently far to provide considerable space between the spring member and the blade-flexing face of the guard for thorough rinsing and drying of the parts. Ample vertical distance is provided between the top and bottom of openings 24 in order that the user may, if he so desires, remove the spring member from the guard, then position the blade on bars 23, 23 so that the blade will be next to the blade-flexing face of the guard, then position the spring member 26 on bars 23, 23 forcing the spring member downwardly thereon until the resilient teeth or fingers 28 thereof snap into slots 24. This vertical distance between top and bottom of slots 24 is in excess of the combined cross-sectional thicknesses of the blade and the spring member and sufficiently in excess thereof not only to permit proper transverse flexing of both the blade and the spring member, but also to permit them, in unflexed state, to be spaced from the blade-flexing face of the guard amply for rinsing. It will be clear that, in instances where the user may wish to position the usual blade next to the guard with the spring member on top of the blade, the spring member will serve to detachably secure the blade to the guard when the cap is separated therefrom. It will be understood that blade B may be provided in a form in which it will have securing fingers or teeth projecting into its positioning slot and spaced longitudinally therein similarly as are teeth 28 of spring member 26, and to function similarly, such a modification being shown and described hereinafter (FIGS. 18 and 19). And it will be further understood that the height of bars 23, 23 from the blade flexing face of the guard is sufficient to project into and position on the guard a normally longitudinally curved blade in a state of equilibrium, and that the slots 24 extend sufficiently high to receive securing fingers or teeth on such a curved blade in a state of equilibrium, such a curved blade being later shown and described herein, (FIGS. 20 and 21).

Extending downward to and in vertical alignment with the ends of slots 24 are vertical grooves 65 (see FIG. 6), providing in bars 23 thinner and inclined wall portions 25. Carried on bars 23 is a flexible spring member 26 shown herein as a perforated flat metal sheet. Member 26 is provided with longitudinal side edge portions of approximately the same length as the bevels which form the shaving edges of the blade, but is relatively narrower than the blade and relatively wider than the blade-flexing face of the cap member, and has at opposite ends narrow central end portions to facilitate removal of the blade by the user. Spring member 26 is a blade-engaging member to reinforce the blade when both are transversely flexed in the razor and, more particularly, to reinforce the margins of the blade which extend laterally outwardly of the blade-flexing face of the cap member, the exposed shaving margins of the blade, and, thereby, strengthen or stiffen these margins and the shaving edges thereon. Member 26 is provided with spaced perforations 27 in the form of slots into which bars 23, 23 project to position member 26 properly on the guard, and, further, member 26 is provided with oppositely disposed, spaced, resilient, securing fingers or teeth 28 which project into slot openings 27 of the spring member and also project into openings 24 of the guard and cooperate with bars 23, 23 thereof, more particularly the flat bottom fixed wall portions 25' of inclined wall portions 25 thereof serving as fastening means or fastening walls rigid with the guard members, which bottom portions being inflexible or stiff, with respect to the spring member, do not yield to the spring member and are formed by openings 24, to detachably snap fasten the spring member on the guard member (see FIG. 6). Teeth 28 each space, longitudinally, transverse openings in the form of slots which extend from openings 27 of the spring member transversely into the body of the spring member, whereby teeth 28 have a length greater than the distance by which they project transversely into slots 27, to facilitate flexing of the teeth during removal or replacement of the spring member. Additional spaced perforations 29 are provided in member 26 to receive cap bars 20, 20. The guard G is provided with oppositely disposed longitudinal guard bars 30 and the longitudinal edges of member 26 are substantially symmetrically or equidistantly spaced inwardly and spaced upwardly of bars 30. The handle H has an internally threaded tubular portion 31 for threaded engagement with the threaded cap post to adjustably fasten the cap and guard members together for flexing the blade and for varying its shaving edge exposure to the guard in the well known manner, and portion 31 extends into the guard and has an annular flange or shoulder portion 32 adjacent an abutment wall formed in the guard by a well in the upper face thereof. Extending a suitable distance into the well formed in the bottom face of the guard is an annular portion 33 of the handle which, together with portion 32, serves to swivel the handle on the guard with the handle rotatably movable as a whole relatively thereto. Entirely housed in the bottom well of the guard and surrounding portion 31 of the handle is a compression coil spring 34, constantly under tension, which bears in one direction on the guard and in the opposite direction on shoulder 33 of the handle. Spring 34 functions primarily to arrest or retard accidental relative rotation of the guard and handle while the user is in the act of assembling the cap member to the guard and handle and during the course of the shaving operation. In manufacture, spring member 26 will be assembled with the guard by being placed on bars 23, 23 with the securing resilient teeth 28 of member 26 in the guiding grooves of, and in engagement with inclined wall portions 25 of, bars 23, 23 and then forced downwardly thereon causing opposite teeth 28 to be flexed sufficiently apart to be passed downwardly to the bottoms of portions 25 forming the top of openings or slots 24, and when opposite the sides of openings 24 the teeth spring thereinto, member 26 then assuming the snap fastened-position as indicated by the dotted outline in FIG. 6. With teeth 28 of the member 26 projecting into slots 24, the bottoms of wall portions 25, being wider than the normal spacing of oppositely disposed teeth 28, cooperate therewith to prevent member 26 from falling off the guard when the latter is turned upside down, and to prevent accidental removal of member 26 from the guard. Whenever, for any desirable reason such as breakage, soiling or discoloring, or to use member 26 as a blade securing member, the user wishes to remove member 26, and replace it, he need only force the member upwardly on bars 23 and cause resilient teeth 28 to be spread downwardly apart by the bottoms of wall portions 25 and continue forcing the member 26 upwardly and off bars 23. The lower side portions of wall portions 25, adjacent the bottoms, are inclined in opposite directions to the upper portions and provide flared walls to facilitate removal of member 26 from the bars or to facilitate entrance of teeth 28 into openings 24 in assembling the parts together. Member 26 may be replaced in the razor by the user in the same manner as has been described in connection with the assembling of the parts in manufacture.

Since bars 23 on the guard G serve not only to secure member 26 thereto and properly position it relatively to guard bars 30 but also serve to project into the blade slot and position the blade laterally relatively to bars 30 and member 26, and will serve, in cooperation with the walls formed by openings or slots 21, 21 in the cap C, to properly position the cap relatively to the guard, cap bars 20, 20 and slots 22 forming cooperating cap positioning walls in the guard may, in some instances, be omitted but preferably not because I prefer to provide the user with the opportunity of using the common or usual blade and, if he so desires, in preparation for the shaving operation, assembling the usual blade first with either the cap or the guard according to his convenience. When the usual commercially presented blade is first assembled on the cap member instead of the guard member, bars 20, 20 position the blade both laterally and longitudinally relatively to the cap member by engaging into the usual elongated blade slot; when said blade is assembled first on the guard instead of the cap member, the blade will be positioned laterally relatively to the guard by bars 23, 23, of the guard, but will be longitudinally slidable on the guard to the extent that the blade may be moved longitudinally far enough in either direction, before bars 23, 23 engage the end walls of the blade slot to stop the movement, to extend, at one end or the other, beyond member 26 and, consequently, to overhang one or the other of the ends of member 26. In instances where the user may remove the cap with the blade remaining on the guard and then wish to reverse or replace the blade he can, if the blade tends to facedly adhere to the spring member, slide the blade longitudinally on the spring member relatively thereto until one or the other central end portion of the blade overhangs the corresponding end of the spring member and then lift the blade by its overhanging end, and this will be clearly understood upon reference to FIG. 3 by observing the relative lengths of blade and spring member on the one hand and, on the other hand, the distance, longitudinally, from the outer end of one bar 23 to the corresponding end of the other bar 23 relatively to the length of, or the distance between opposite longitudinal ends of, the blade slot.

Blade B being interposed between the clamping members, and the threaded cap post being brought into engagement with the handle, turning of the handle in the usual direction draws cap and guard relatively towards each other and causes the blade and the spring member 26 to be transversely flexed in parallel, or substantially parallel, planes, as clearly shown in FIG. 4, with member 26 extending laterally outwardly of the blade flexing face of the cap member C and inwardly of the shaving edges of the blade B and bracing or reinforcing the exposed margins of the blade which extend laterally outwardly of the cap and on which margins are the shaving edges of the blade.

In the modification of the combined guard and handle portion, of the razor, shown in FIGS. 7 and 8, guard member Ga is provided with a central longitudinal shallow groove or slot 36 extending on opposite sides of the well for the upper end of the handle and also formed in the blade-flexing face of the guard. These slots 36 connect with and comprise inward extensions of oppositely disposed vertical end slots or openings 22a. Spring member 26a securing and positioning, and blade positioning, bars 23a, instead of being integral with the guard, are formed on an end of a metal strip 23a' bent double or back upon itself, forming a double layer strip 23a'' substantially in the form of an inverted T. Bars 23a are, from the spring member 26a downward, of an inverted L-shape with the horizontal arm of the L-shape bars seated on shoulders in the guard member at the bottoms of slots 36 and have long downward extensions 37 which, as will be clearly observed in FIG. 7, are offset outwardly as to the upper portions of the bars, the portions in which slots 24a are located, and are offset outwardly somewhat of slots 36 and which have inner faces resting against the guard member at the inner ends of slots 22a; the lower ends 33 of the extensions 37 are spread apart in opposite directions against the bottom face of the guard and these flanged lower ends 38, together with the shoulder portions formed by slots 36, serve to positively clamp bars 23a fixedly secured to the guard and in proper position thereon. If desired, pins 39 may be employed to secure the ends 38, or to further secure these ends, to the guard. With bars 23a thus positioned, face portions 40 serve as abutments or limits for the bars on the cap which are receivable in end openings 22a. Spring member 26a is resting upon the blade-flexing face of the guard rather than upon shoulders in bars 23a. In other respects the parts are the same and function similarly as described in connection with FIGS. 1 to 6 inclusive, and parts 24a, 25a, 25a', Ga, 30a and Ha being the same respectively as described parts 24, 25, 25', G, 30 and H.

In the modification of razor shown in FIGS. 9, 10 and 11 and 12, blade-engaging and reinforcing spring member 26b is shown as incorporated in an otherwise well known one piece razor commercially presented by the Gillette Safety Razor Company, of Boston, Mass. and made in accordance with Patent No. 1,956,175, granted April 24, 1934 to J. Muros. Double edge flexible razor blade Bb has a central longitudinal slot terminating at opposite ends thereof in transverse slot portions 41. This razor comprises a blade-flexing and clamping cap divided into pivotally mounted cap sections 42 and 43, on opposite corners of which are projections or lugs 44 defining opposite longitudinal ends of recessed inner cap section edges which, when the cap is closed, provide a central slot to receive blade locating and positioning bar 23b which extends uprightly of the clamping face of the guard Gb. Bar 23b is receivable in the central slot of blade Bg and has oppositely disposed transverse end portions 45 receivable in slot portions 41 of the blade, and is secured to the upper end of a spindle 46 extending through guard Gb from handle Hb. The handle has a head portion fixed to the guard, a barrel or sleeve portion 47 fixed to the head portion and a rotatable, adjusting nut 48 which extends into sleeve 47 and as swivelled thereon by a groove and indentation connection and which, at its upper end, is telescopically connected to the lower end of spindle 46 whereby rotation of nut 48 causes the spindle with bar 23b to move longitudinally up or down relatively to the guard, suitable means being provided to limit this longitudinal movement of the spindle in the well known manner. Cap sections 42 and 43 are pivotally mounted on end members 49, forming end extensions of bar 23b, by means of pins extending from members 49 into holes in arms of the cap sections and whereby, together with cam action, upward movement of spindle 46 opens sections 42 and 43 away from each other and downward movement of the spindle draws the sections together, the inner faces of the cap sections being transversely concave. In the bridging portion of bar 23b and upwardly from the bottom thereof, I have formed spaced, transverse slots 24b and, as shown with the parts positioned as in FIGS. 9 and 10, blade-engaging spring member 26b is resting upon end members 49 with bar 23b projecting through the slot 27b of member 26b and with the resilient securing teeth 28b of the spring member projecting into said slot and being disposed directly beneath slots 24b in bar 23b, member 26b being freely movable up and down upon bar 23b and being freely movable upwardly until the teeth 28b engage the wall portions of the bar formed therein by the upper ends of slots 24b whence force is required to remove member 26b from the bar by bending teeth 28b as has been described earlier herein. Slots 24b extend sufficiently far upwardly in the bar to accomplish in a similar manner the same results as slots 24a, previously described. Above slots 24b, bar 23b is slightly narrowed in thickness by vertical grooves 25b, as shown, in which the teeth 28b pass upon removal or replacement of member 26b, in the manner previously described herein. The central end portions of blade Bb are shorter than the corresponding end portions of member 26b to enable the user, under conditions in which the blade may tend to facedly adhere to the member 26b, to separate the blade from the spring member by bending a central end portion of the latter to insert a finger nail between it and the corresponding end of the blade, it being obvious, in this instance, that the length of bar 23b relative to length of blade slot substantially prevents endwise or longitudinal sliding of the blade relatively to the spring member. The user may, if he so desires, forcibly remove member 26b, pass the blade down on bar 23b, snap on member 26b after the blade, and, thus, secure the blade. In FIG. 11, blade Bb and spring member 26b are shown flexed parallel and tightly clamped in an operative shaving position with member 26b reinforcing the exposed margins of the blade upon which margins are the shaving edges of the blade. Cap sections 42 and 43 are substantially straight longitudinally as shown in FIG. 9, the end view in FIG. 10 being shown as being taken looking down the longitudinal center line of the head.

In FIG. 13 is shown a modification of the spring member part of the razor as to its shape relatively to the shape of the present day, or orthodox, safety razor double edge flexible blade: Spring member 26c not only has central end portions longer than the corresponding end portions of flexible blade Bc, but, also, has its central end portions 50 narrower than the corresponding end portions of the blade, the sides 51 of end portions 50 being inclined to expose the corners 52 of the central end portions of the blade to enable the user to separate the blade from the reinforcing spring member by bending end portions 50 thereof by the fingers of one hand and by grasping by the fingers of the other hand the exposed corners 52 of blade Bc, for example, diagonally opposite corners. Teeth 28c function similarly and are the same as corresponding parts previously described herein, and member 26c being otherwise similar to the corresponding spring member shown in the razor and modifications thereof in FIGS. 1 to 6 inclusive; 7 and 8; and 9, 10 and 11 as to function, width and thickness.

In the modification of safety razor shown in FIGS. 14, 15 and 17, blade-flexing and clamping cap member Cd is, on its outer and convex face, provided, on opposite longitudinal sides of its threaded, central, handle fastening post, with dished out recesses 53 from which spaced holes 54 extend through its inner concave, blade-flexing and clamping face. Spring member securing, blade locating or positioning and cap positioning bars 23d are provided on the cap member and project downwardly of the clamping face thereof, or substantially normal to the main or lengthwise axis of the cap member, and have relatively narrow, spaced arms 55 extending through holes 54 and terminating in oppositely bent end portions 56 which, together with bar shoulders 57, securely clamp the bars to the cap fixedly thereto and in proper position thereon. The rigid side portions of the bars 23d which are receivable in slots 22d of the guard member serve as guard-guiding means or side portions to engage the guard for guiding the members towards each other and, especially, for guiding the guard relatively to the blade. It will also be observed that bars provide and serve as securing means for the spring member 26d whereby to solely hold the spring member and the cap member in assembled relation and also permit the spring member to be concentrically flexed facially together with the blade to facially support the blade. Bars 23d have slots 24d receiving the resilient teeth 28d, of blade-engaging and reinforcing spring member 26d, which project into the central longitudinal slot 27d of the spring member, and the bars have inclined wall portions 25d at the rear of grooves and fixed fastening walls 25d' to cooperate with the resilient securing teeth for solely holding the spring member and the cap member in assembled relation similarly as the previously described guard and spring member assembly. Slots 24d extend similarly high for the similar purposes as previously described in connection with slots 24a and 24b. Guard Gd has guard bars 30d (similar to bars 30, FIGS. 1 and 4) and, at opposite longitudinal ends, has slots 22d to receive cap bars 23d. Handle Hd is swivelled to the guard, relatively rotatable thereto in the same manner and for similar purposes as previously been described. As a result of securing, detachably, spring member 26d to the cap instead of the guard, blade Bd is interposed between the guard and the spring member; both blade and spring member are between cap and guard. The user may, if he so desires, forcibly remove the spring member from the cap, place the blade on the cap, snap the spring member on the cap after the blade and, thereby, use the spring member as a blade securing member on the cap. As will be clear upon reference to FIG. 17, spring member 26d is longer than blade Bd and has central end portions 50d which are narrower than the corresponding end portions of the blade for the purpose of exposing the corners 52d of the blade. Further, it will be clear, upon reference to FIG. 15, that the margins of 26d which extend laterally outwardly of the cap member do not project beyond but, preferably, lie inside of planes tangential to the outer surface of the cap member and the shaving edges of the blade, such planes as indicated by the lines X and Y, to avoid interference with the cutting action of the blade edges by avoiding lifting of the localized areas of the user's skin away from the shaving edges of the blade. Also, it will be observed that the side edges of the spring member margins lie inwardly of the shaving edge bevels of the blade thus avoiding any tendency for shaving material to become clogged between the blade and the spring member and tend to lift or depress one relatively to the other.

In the modification of blade-engaging spring member shown in FIG. 16, spring member 26e has oppositely disposed longitudinally extending side edge margins 58 which are thinner in cross-section than the main body of the spring member and which are formed with laterally inclined or transversely inclined margin faces, e.g. by bevel faces, on one face only of the spring member, extending from the longitudinal lines as indicated at 59 laterally or transversely outwardly to the extreme longitudinally extending side edges of the spring member, and, as will be clear, these bevelled face margins are on the face of the spring member which is opposite to the blade-engaging face thereof and which, in this instance, is adjacent the blade-flexing face of the cap member. Member 26e is, preferably, slightly wider than the previously shown and described spring members herein and reinforce the exposed blade margins closer to the shaving edges thereon, the inclination of the bevelled face margins of member 26e being such as to not interfere with the cutting action of the blade's shaving edges, for example, the inclination being such as to avoid lifting of the user's skin by the spring member away from contact with the shaving edges of the blade at the desirable shaving angle or angles. In other respects the parts and the relationship of the parts shown in FIG. 16 are similar to those shown in FIGS. 14, 15 and 17 and described in connection therewith, and it will be understood that, in some instances, previously shown and described members 26, 26a, 26b, 26c and 26d may be provided on one face only with inclined face margins similar to margins 58 shown in FIG. 16.

The modified flat flexible razor blade Bf shown in FIGS. 18 and 19 has the usual oppositely disposed straight shaving edges 60, 60 and is centrally perforated to provide the elongated blade locating or positioning slot 61 into which project oppositely disposed blade securing, resilient fingers or teeth 62 to engage in openings or slots 24, or 24a, or 24b, or 24d for detachably securing or snap fastening the blade, between the blade-engaging spring member and either the guard or cap, as the case may be, on bars 23, or 23a, or 23b, or 23d of the razor and modifications thereof previously described and shown. Thus detachably secured, blade Bf will not accidentally fall off when the cap is removed from the guard or is opened up relatively thereto. Blade Bf is of similar length, width and thickness and is similarly transversely flexible as blade B, or Bb, or Bc, or Bd. The user may forcibly snap blade Bf on or off the guard or cap member, as the case may be, in the same manner as has been described in connection with the spring member and may interpose the blade between the blade-flexing face of the guard and the spring member, or between the latter and the blade-flexing face of the cap. Securing teeth 62, 62 of blade Bf preferably, although not necessarily, are at least as long as and, consequently, as flexible as the corresponding teeth of the spring member, but do not project into the blade slot 61 as far as the securing teeth of the spring member project into the latter's positioning slot and, therefore, the blade is less securely retained or snap fastened than is the spring member by the bottom walls formed in the positioning bars by openings 24, 24a, 24b or 24d because teeth 62, 62 do not project into said openings as far as the corresponding teeth of the spring member do, with the result that the blade is more easily manually forced off the razor for reversing or replacement than is the spring member.

In the further modification of replaceable, facedly reersible, flexible razor blade shown in FIGS. 20 and 21, longitudinally and transersely flexible razor blade Bg is, in its normal state, a longitudinally arcuately curved spring steel, or an alloy of spring steel, body of cylindrical segmental sheet form having similarly arcuate, oppositely disposed shaving edges 60, 60. The preferred radius of longitudinal curvature of this blade is so related to the length of its shaving edges relative to total length of blade body as to space the shaving edges from a flat surface when the blade is placed thereon with its convex face 63 up. The radius of longitudinal curvature is also related to the blade locating and positioning means in the razor, both as to the distance to which said means extend uprightly of the blade-flexing face of the guard member, or the cap member, as the case may be, and as to the longitudinal distance of said means relatively to the cooperating positioning means in the blade formed by its blade locating slot 61 so as to enable the blade locating and positioning means of the razor to engage into blade locating slot 61 of the blade and position the blade when the latter is in a state of equilibruim with either its convex face 63 or its concave face 64 up or down, that is, facing the cap, for example. This preferred radius of curvature should not, however, be regarded as a limitation, since the blade being flexible, it may, if desired, have a normal or initial longitudinal curvature on any other suitable radius. The pairs of teeth 62 are axially spaced apart longitudinally, as pairs, a distance which, when blade Bg is flattened completely, or straightened, from its normally curved shape, is the same as the longitudinal distance between the axes of the corresponding pairs of teeth on spring members 26, 26a, 26b, 26c, 26d, 26e and blade Bf. However, teeth 62 are individually narrower in width than said corresponding pairs of teeth and narrow enough to be received in the grooves of the spring member securing bars of the razor whether the blade is in its normally arcuate shape or in any flattened or straightened shape, and the teeth 62 are narrow enough, also, relative to the width of previously described teeth-receiving openings 24, 24a, 24b and 24d to be received therein, and without distortion, when the blade is in its normally arcuate shape, or in a flattened shape, or is in a transversely flexed arching shape. Blade Bg, during the clamping operation in the razor, is first flexed longitudinally to a flat or straight shape and held under longitudinal tension by the cooperative action of the longitudinally straight cap and guard members and then is transversely flexed and narrowed or arched thereby to the usual transversely flexed shape in which its shaving edges 60, 60 are straight and its total length of shaving edge margin, length of shaving edges, width and its cross-sectional thickness are the same as previously described blades B, Bb, Bd and Bf. When blade Bg is thus transversely flexed bodily, the shaving edges are firmer or more rigid for shaving and greater tension exists between the razor head and the rotatable handle to prevent accidental relative rotation thereof at a tight or a looser adjustment of parts than is the case with a normally flat blade of similar thickness at a similar degree of flexure transversely and will present at all degrees of transverse flexure stiffer shaving edges.

In FIG. 22, blade Bh, otherwise similar to blade Bg in FIGS. 18 and 19, is shown clamped in a razor, similar to the razor in FIGS. 1–6 inclusive, with its flexible securing teeth 62b engaged in the slots 24h of the positioning bars together with the securing teeth of the spring member 26h.

In FIG. 23, blade Bi, otherwise similar to blade Bg in FIGS. 20 and 21, is shown clamped in a razor, similar to the razor in FIGS. 1–6 inclusive, with its flexible securing teeth 62c engaged in the slots 24i of the positioning bars together with the securing teeth of the spring member. In FIG. 24, the parts shown in FIG. 23 are loosened to show the cylindrically curved blade Bi in a state of substantial equilibrium.

In FIG. 25, blade Bj, otherwise similar to blade Bf in FIGS. 18 and 19, is shown clamped in a razor similar to the razor shown in FIGS. 14, 15 and 17 with its flexible securing teeth engaged in slots 24j of the positioning bars together with the securing teeth of the spring member 26j. The lines Xa and Ya indicate planes tangential to the outer surface of the cap member and the shaving edges of the blade.

In FIG. 26, blade Bk is shown clamped in a razor similar to the razor in FIGS. 14, 15 and 17 with its flexible securing teeth engaged in slots 24k of the positioning bars together with the securing teeth of the spring member 26k, the pairs of securing teeth in the blade being longitudinally spaced further apart, that is co-equally with slots 24k, than the corresponding teeth in blade Bg of FIGS. 20 and 21, but the blade Bk being otherwise similar to the blade Bg. Blade Bk is shown herein held under both longitudinal and transverse tension by the longitudinally straight blade-clamping members, and the side edges of the spring member 26k are shown lying within or inside of planes tangential to the outer surface of the cap member and the shaving edges of the blade, the planes being indicated by the lines X*b* and Y*b*. In FIG. 27, the parts shown in FIG. 26 are loosened to show the cylindrically curved blade B*k* in a state of substantial equilibrium. It will be clear that, because of the initial longitudinal curvature of the blade B*g* (see FIG. 20) and the desirability of positioning similar blade B*k* on the blade-positioning bars of the razor with the blade in an unflexed state, it is preferable that the straight line distance longitudinally between the securing teeth of the blade in its unflexed state be equal to the longitudinal distance between the slots 24*k*; consequently, when the blade is in the completely flattened state or in a transversely curved state in the razor, the longitudinal distance between its securing teeth will be slightly greater than in the initially flat blade B*f* and this result is obtained by making the teeth of the curved blade individually narrower in width than the corresponding teeth in the flat blade, as hereinbefore pointed out in the description of blade B*g* (FIGS. 20 and 21).

Blade B*f*, or blade B*g*, or B*k*, when positioned in the razor with their securing teeth engaged in the teeth-receiving openings in the spring member positioning and securing bars or bar will be prevented from accidentally falling off the razor head, when cap and guard are separated, for the same reason as has been described in connection with the spring member, whether or not the spring member is in the razor at the time.

Referring again to FIGS. 4, 11, 15 and 16, it will be understood that, although the longitudinal side edges of the spring member are clearly shown as being spaced laterally inwardly of the shaving edge-forming bevels of the blade, these illustrations of the preferred relative width of spring member to blade width are not to be construed as a limitation as to the maximum width of the spring member relative to the width of the blade as a whole or the width of the blade between its shaving edge-forming bevels, and that in some instances the spring member may be commercially presented with a width equal to, or substantially equal to, the width of the blade between the inner ends of its shaving edge-forming bevels.

While I have described several embodiments of my invention, it is to be understood that they are for the purposes of illustration rather than limitation and that the scope of my invention is to be determined by the claims herein.

This present application is a continuation of the application for Letters Patent filed by me December 11, 1953, Serial Number 397,678 for an improvement in Safety Razors (title amended to Safety Razor With a Flexible Blade and Relative Blade and Guard Adjustment), allowed Feb. 13, 1958, and now abandoned in favor of this application.

Having described the invention, I claim:

1. A safety razor including relatively movable cap and guard blade-clamping members, each of said members having a main axis, the clamping face of the cap member being concave and cooperative with the clamping face of the guard member for flexing a flexible razor blade, blade-positioning means in said razor projecting from one of said members and when in shaving condition in a plane substantially normal to the main axis of one of said blade-clamping members, the blade-positioning means having means to receive a blade, and fixed securing means on said blade-positioning means to cooperate with a blade and unyielding thereto for detachably snap-fastening the blade on the razor opposite the clamping face of one of said blade-clamping members, and means for moving said blade-clamping members relatively towards each other to flex and clamp a blade therebetween.

2. A safety razor including relatively movable cap and guard blade-clamping members, each of said members having a main axis, the clamping face of the cap member being concave and cooperative with the clamping face of the guard member for flexing a flexible razor blade, blade-positioning means in said razor projecting from one of said members when in shaving condition in a plane substantially normal to the main axis of one of said blade-clamping members, a flexible blade-engaging leaf spring member wider than the cap member and apertured to receive said blade-positioning means with said spring member disposed between said blade-clamping members with laterally oppositely disposed longitudinally extending side edge margins of said spring member disposed laterally outwardly of the side edges of the cap member for reinforcing a replaceable flexible razor blade wider than said spring member and apertured to receive said blade-positioning means with said blade facedly opposite said spring member and with oppositely disposed shaving edges of said blade extending longitudinally with and laterally outwardly of said side edge margins of said spring member, blade-snap fastening means in said blade-positioning means spaced from said clamping face of said one of said blade-clamping members by blade securing teeth-receiving means comprising a fixed indent opening extending into the material of said blade-positioning means for receiving said blade movable bodily on said blade-positioning means in a direction substantially normal to the clamping face of said one of said blade-clamping members and with the blade cooperative with said blade-snap fastening means in said blade-positioning means for detachably snap fastening said blade on said razor disposed between said blade-clamping members thereof and facedly opposite said spring member, and means for relatively moving said blade-clamping members towards each other to flex, and clamp together, said spring member and said blade.

3. A safety razor including relatively movable cap and guard blade-clamping members, each of said members having a main axis, the clamping face of the cap member being concave transversely and cooperative with the clamping face of the guard member for flexing a flexible razor blade, combined blade-positioning and spring member-positioning means in said razor projecting from one of said members when in shaving condition in a plane substantially normal to the main axis of one of said blade-clamping members, a flexible blade-engaging and reinforcing leaf spring member wider than the cap member and apertured to receive said blade-positioning and spring member-positioning means with laterally oppositely disposed longitudinally extending side edge margins of said spring member disposed laterally outwardly of the side edges of said cap member for reinforcing a flexible replaceable razor blade wider than the spring member and apertured to receive said blade-positioning and said spring member-positioning means with said blade facedly opposite said spring member and with oppositely disposed shaving edges of said blade extending longitudinally with and laterally outwardly of said side margins of said spring member, means on said blade-positioning and spring member-positioning means cooperative with flexible means in said spring member and with the blade for detachably snap fastening said spring member and the blade on said razor facedly opposite each other and opposite the clamping face of said one of said blade-clamping members for solely holding the blade and spring member and said one of said blade-clamping members in assembled relation snap-fastened together, the flexible means in the spring member cooperative with said means on the blade-positioning and spring member-positioning means for detachably snap-fastening the spring member on said one of said blade-clamping members more securely than the blade, and means for relatively moving said blade-clamping members towards each other to flex, and clamp together, said spring member and said blade.

4. In a safety razor having relatively movable cap and guard blade-flexing members, each of said members having a main axis, and means for moving said members relatively towards each other to clamp a blade therebetween, the combination of blade-positioning means projecting from one of said members when in shaving condition in a plane substantially normal to the main axis thereof to position a flexible razor blade apertured to receive said blade-positioning means, an initially flat, leaf spring member apertured to receive said blade-positioning means and disposed between the blade and the clamping face of said one of said members, to support the blade when the latter is flexed in the razor, flexible fastening teeth in said spring member, the blade-positioning means having openings to receive said teeth of said spring member, and said openings disposed in said blade-positioning means adjacent fixed spring member-fastening means extending transversely on said blade-positioning means and cooperative with said fastening teeth of said spring member to detachably snap fasten said spring member on and in interlocked engagement with said blade-positioning means.

5. In a safety razor having relatively movable cap and guard blade-flexing members, the cap member having a main axis, and means for moving said members relatively towards each other to clamp a blade therebetween, the combination of blade-positioning means projecting from the cap member when in shaving condition in a plane substantially normal to said main axis thereof to position a flexible razor blade apertured to receive said blade-positioning means, an initially flat, leaf spring member apertured to receive said blade-positioning means and disposed between the blade and the clamping face of the cap member, the spring member being wider than the cap member and narrower than the blade for supporting the side margins of the latter outwardly of the side edges of the cap member when the blade is transversely flexed, flexible fastening teeth in said spring member, the blade-positioning means having openings to receive said teeth of said spring member, and said openings disposed in said blade-positioning means adjacent fixed spring member-fastening means extending transversely on said blade-positioning means and cooperative with said fastening teeth of said spring member to detachably snap fasten said spring member on and in interlocked engagement with said blade-positioning means.

6. In a safety razor having relatively movable cap and guard blade-flexing members, the cap member having a main axis, and means for moving said members relatively towards each other to clamp a blade therebetween, the combination of spring member-positioning means projecting on the cap member when in shaving condition in a plane substantially normal to said main axis thereof, in the direction in which said clamping face faces, and receivable in a transversely flexible, replaceable razor blade apertured to receive said spring member-positioning means and having oppositely disposed shaving edges, a transversely flexible leaf spring member apertured to receive said spring member-positioning means and disposed between the blade and the clamping face of the cap member, the spring member being wider than the cap member and narrower than the blade for supporting the side margins of the latter outwardly of the side edges of the cap member and adjacent the shaving edges of the blade when the blade and the spring member are flexed by the cap and guard members, the spring member-positioning means and the spring member cooperative to retain the latter positioned with its side edges disposed inwardly of the shaving edges of the blade, and fixed means on said spring member-positioning means securing said spring member to said cap member for solely holding the cap member and the spring member in assembled relation and with the spring member free to be flexed transversely concentrically with said blade to facially support the latter.

7. In a safety razor having relatively movable cap and guard blade-flexing members, the cap member having a main axis, and means for moving said members relatively towards each other to clamp a blade therebetween, the combination of spring member-positioning means projecting on the cap member when in shaving condition in a plane substantially normal to said main axis thereof and receivable in a transversely flexible, replaceable razor blade apertured to receive said spring member-positioning means and having oppositely disposed shaving edges, a transversely flexible, initially flat, leaf spring member apertured to receive said spring member-positioning means and disposed between the blade and the clamping face of the cap member, the spring member being wider than the cap member and narrower than the blade for supporting the side margins of the latter outwardly of the side edges of the cap member and adjacent the shaving edges of the blade when the blade and the spring member are flexed by the cap and guard members, the spring member-positioning means and the spring member cooperative to retain the latter positioned with its side edges disposed inwardly of the shaving edges of the blade, and fixed means on said spring member-positioning means securing said spring member to said cap member for solely holding the cap member and the spring member in assembled relation and with the spring member free to be flexed transversely concentrically with the blade to facially support the latter and with the side edges of the spring member lying inside planes tangential to the outer surface of the cap member and the shaving edges of the blade.

8. A safety razor including, in combination, relatively movable cap and guard members having blade-clamping faces cooperative for transversely flexing and clamping a flexible razor blade, the cap member having a main axis and a hollow blade-clamping face, rigid blade-positioning projections extending downwardly from the cap member when in shaving condition in a plane substantially normal to the main axis of the cap member and having rigid guard-guiding side portions to engage the guard for guiding said members relatively towards each other, said projections receivable in a transversely flexible razor blade apertured to receive said blade-positioning projections to position the blade between said members, said blade-positioning projections having openings therein disposed adjacently above blade-fastening means on said blade-positioning means for receiving said blade to cooperate with said blade-fastening means for detachably interlocking the blade on said blade-positioning projections for solely holding the blade and the cap member in assembled relation, and a rotatable handle member for moving said cap and guard members relatively towards each other.

9. In a safety razor having relatively movable cap and guard blade-flexing members and means for moving said members relatively towards each other to clamp a blade flexed therebetween, each of said members having a main axis, the combination of spring member-fastening means projecting from one of said members when in shaving condition in a plane substantially normal to the main axis of said one of said members and receivable in a transversely flexible, replaceable razor blade apertured to receive said spring member-fastening means, a transversely flexible spring member disposed between the blade and the clamping face of said one of said blade-flexing members for supporting the blade adjacent a longitudinal shaving edge when the blade and the spring member are flexed by the cap and guard members, securing teeth in said spring member, and said spring member-fastening means having means receiving said securing teeth and disposed in said spring member-fastening means adjacent fixed fastening means spaced from the clamping face of said one of said blade-flexing members and cooperative with said teeth for securing said spring member to said one of said blade-flexing members for solely holding said one of the blade-flexing members and said spring member in assembled relation and for permitting said spring member to be flexed concentrically with and facially together with the blade to facially support the latter.

10. In a safety razor having relatively movable cap and guard blade-flexing members and means for adjustably moving said members relatively towards each other to clamp a blade adjustably flexed therebetween, each of said members having a main axis, the combination of spring member-fastening means projecting from one of said members when in shaving condition in a plane substantially normal to the main axis thereof and receivable in a transversely flexible, replaceable razor blade apertured to receive said spring member-fastening means and having oppositely disposed longitudinal shaving edges, a transversely flexible leaf spring member apertured to receive said spring member-fastening means and disposed between the blade and the clamping face of said one of said blade-flexing members, the spring member being wider than the cap member and narrower than the blade for supporting the side margins of the latter outwardly of the side edges of the cap member an dinwardly of the shaving edges of the blade when the blade and the spring member are flexed by the cap and guard members, longitudinally spaced securing teeth in said spring member, and said spring member-fastening means having longitudinally spaced openings receiving said teeth movable in said openings and on said spring member-fastening means in the direction towards the clamping face of the cap member, said openings disposed in said spring member fixed-fastening means adjacently opposite fastening means spaced from the clamping face of said one of the blade-flexing members and cooperative with said teeth for securing said spring member to said one of the blade-flexing members for solely holding said one of the blade-flexing members and said spring member in assembled relation and with the spring member free to be flexed transversely concentrically and facially together with said blade to facially support the latter.

11. In a safety razor having relatively movable cap and guard blade-flexing members provided with rigid blade-clamping faces and means for adjustably moving said members relatively towards each other to clamp a flexible razor blade flexed therebetween, the combination of a transversely flexible spring member disposed between the blade and the blade-clamping face of one of said blade-flexing members for supporting the blade when the blade and the spring member are flexed by the cap and guard members, and said one of said blade-flexing members having fixed means to receive the spring member and having securing means unyielding to the spring member and cooperative with latter for solely holding the spring member and said one of the blade-flexing members in assembled relation and for permitting said spring member to be flexed concentrically with and facially together with the blade to facially support the latter.

12. In a safety razor having relatively movable cap and guard blade-flexing members provided with rigid blade-clamping faces and means for adjustably moving said members relatively towards each other to clamp a flexible razor blade flexed therebetween, the combination of a transversely flexible, initially flat, spring member disposed between the blade and the blade-clamping face of one of said blade-flexing members for supporting the blade when the blade and the spring member are flexed by the cap and guard members, and said one of said blade-flexing members having means receiving the spring member and having securing means unyielding to the spring member and cooperative with the latter for solely holding the spring member and said one of the blade-flexing members in assembled relation and for permitting said spring member to be flexed entirely concentrically with and facially together with the blade to facially support the latter.

13. In a safety razor having relatively movable cap and guard blade-flexing members provided with rigid blade-clamping faces and means for adjustably moving said members relatively towards each other to clamp a flexible razor blade flexed therebetween, the combination of a transversely flexible, initially flat, spring member disposed between the blade and the blade-clamping face of the guard member for supporting the blade when the blade and the spring member are flexed by the cap and guard members, means positioning the spring member and projecting upwardly of the blade-clamping face of the guard member and having an opening receiving the spring member and defining securing means fixed on said means positioning the spring member and unyielding to the spring member and cooperative with the spring member for solely holding the spring member and the guard member in assembled relation and with said spring member free to be flexed entirely concentrically with and facially together with the blade to facially support the latter.

14. In a safety razor having relatively movable cap and guard blade-flexing members and means for adjustably moving said members relatively towards each other to clamp a flexible razor blade flexed therebetween, the combination of a transversely flexible spring member disposed between the blade and the blade-clamping face of one of said blade-flexing members for supporting the blade when the blade and the spring member are flexed by the cap and guard members, means positioning the spring member and having securing means fixed on said means positioning the spring member and unyielding to the spring member and cooperative with the spring member for solely holding the spring member and said one of the blade-flexing members in assembled relation, said securing means defined by an opening receiving the spring member and spacing said securing means oppositely away from the clamping face of said one of said blade-flexing members a distance greater than the thickness of the spring member, and said spring member movable bodily as a whole and free to gravitate on said means positioning the spring member between said securing means thereof and the clamping face of said one of said blade-flexing members to space the spring member from said clamping face in the assembled relation.

15. In a safety razor having relatively movable cap and guard blade-flexing members provided with rigid blade-clamping faces and means for adjustably moving said members relatively towards each other to clamp an apertured, flexible razor blade flexed therebetween, the guard member having a main axis the combination of a transversely flexible, initially flat, spring member disposed between the blade and the clamping face of the guard member for supporting the blade when the blade and the spring member are flexed by the cap and guard members, means positioning the spring member and projecting upwardly of the blade-clamping face of the guard member and projecting when in shaving condition in a plane substantially normal to the main axis of the guard member, the means positioning the spring member being receivable in an apertured blade to position the latter and having an opening receiving the spring member and defining securing means fixed on said means positioning the spring member and unyielding to the spring member and cooperative with the spring member for solely holding the spring member and the guard member in assembled relation and holding said spring member free to be flexed concentrically as a whole with and facially together with the blade to facially support the latter.

References Cited in the file of this patent

UNITED STATES PATENTS

| 890,406 | Cobb | June 9, 1908 |
|---|---|---|
| 1,351,713 | Barry | Aug. 31, 1920 |
| 1,574,793 | Cohen | Mar. 2, 1926 |
| 1,728,008 | Schmidt | Sept. 10, 1929 |

(Other references on following page)

UNITED STATES PATENTS

| | | |
|---|---|---|
| 1,803,177 | Ericsson | Apr. 28, 1931 |
| 1,911,378 | Martin | May 30, 1933 |
| 1,925,098 | Kimberly | Sept. 5, 1933 |
| 2,037,849 | Brown | Apr. 21, 1936 |
| 2,393,366 | Hammond | Jan. 22, 1946 |
| 2,612,684 | Mansfield | Oct. 7, 1952 |

FOREIGN PATENTS

| | | |
|---|---|---|
| 870,960 | France | Jan. 3, 1942 |
| 863,917 | Germany | Jan. 22, 1953 |
| 410,273 | Great Britain | May 17, 1934 |
| 424,013 | Italy | Aug. 1, 1947 |
| 433,372 | Italy | Apr. 7, 1948 |